3,104,551
CONTACT PHIAL FOR THERMOSTATICALLY OPERATED VALVES AND SIMILAR DEVICES WHICH ARE SUBJECTED TO THE ACTION OF GASEOUS OR LIQUID PRESSURES
Peter Christian Matthiesen, Elsmark, Nordborg, Als, Denmark, assignor to Danfoss ved ingenior Mads Clausen, Elsmark, Nordborg, Als, Denmark, a Danish firm
Filed Nov. 12, 1957, Ser. No. 695,937
Claims priority, application Denmark Nov. 14, 1956
7 Claims. (Cl. 73—368)

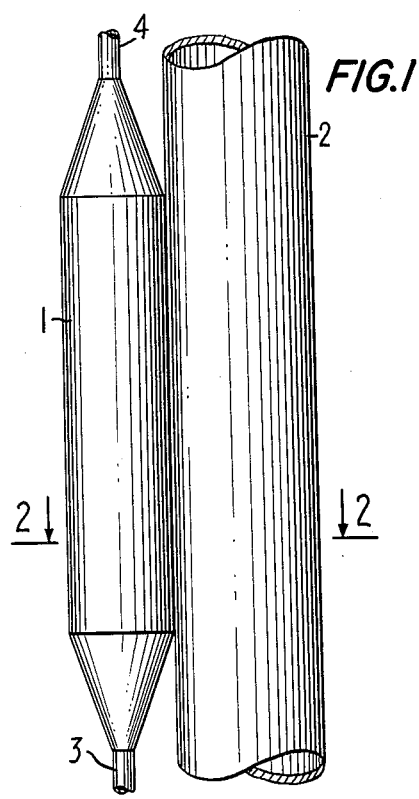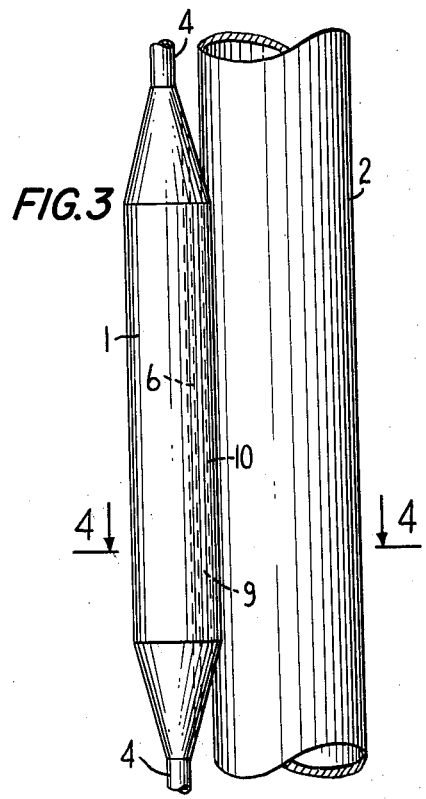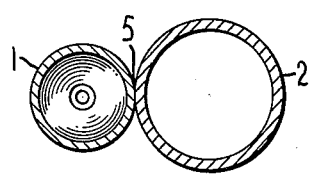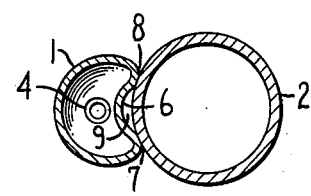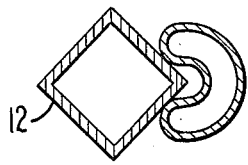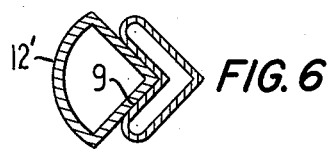
INVENTOR.
PETER CHRISTIAN MATTHIESEN
ATTORNEY

United States Patent Office 3,104,551
Patented Sept. 24, 1963

The invention relates to a contact feeler or phial for thermostatically operated valves or similar devices which are subjected to the action of gaseous or liquid pressures, the said contact phial being of the kind consisting of a container of substantially circular cross-section and containing a liquid, gas or gas-absorbing solid substance sensitive to temperature variations, the said container being in contact with a flat or cylindrical heat or cold-transmitting surface when used so that the temperature variation of the said surface acts on the device in question by means of the pressure exerted by the gas or liquid in the container.

Contact phials of the aforesaid kind are shown, but it is a drawback that heat or cold by contact can only be transmitted along a single straight line or at a number of different points of a straight line along the surface of transmission. This involves a certain inefficiency in the heat transmission so that there is a certain interval of time before a temperature variation becomes apparent by a pressure variation in the gaseous or liquid pressure in the container. A further disadvantage of the known contact phials is that it is rather inconvenient to attach them to the heat or cold-transmitting surface, for example to the outer side of a cylindrical pipe, since two surfaces that are only in contact with each other along a straight line or along a number of different points along a straight line are liable to roll on each other when intimately assembled.

It is the object of the invention to devise a contact phial or feeler having none of the aforesaid drawbacks.

An essential feature of a contact phial according to the invention is that the container has a deformation permitting the container to rest in contact with the heat or cold-transmitting surface along at least two generation curves on the said surface.

As a result, the transmission of heat or cold is substantially quicker than if the contact phial is only resting in contact along a single straight line on the said surface. A further result obtained is that it becomes substantially easier to attach the contact phial to the heat or cold-transmitting surface and the attachment becomes more stable, the container being controlled by a large number of points on the said surface that are not linearly connected.

In an embodiment of the contact phial according to the invention and of the kind consisting of a circular, straight cylinder the container is provided with such a deformation depressed in the cylindrical wall and extending parallel to the axis of the container that the container may rest in contact with the heat and cold-transmitting surface along at least two generatrices of the said surface.

The result obtained is that the transmission of heat or cold takes place along at least two generatrices on the surface, the said generatrices furthermore determining the position of the container in relation to the surface.

In another embodiment of the contact phial according to the invention the deformation consists of a longitudinal depression formed in the container wall, as a result of which the deformation may be produced in the said wall by a simple rolling of the container wall in longitudinal direction by means of a roller which has a protruding edge conforming to the shape of the depression, but in a third embodiment of the contact phial according to the invention the deformation may consist of a flattening of a part of the outer wall of the container. As a result, the deformation may be produced in suitable manner by rolling the container between a cylindrical roller and another roller having a toroid surface corresponding substantially to the circular cross-section of the container.

In a fourth embodiment of the contact phial according to the invention which is of the kind in which at least one of the ends of the container communicates with a capillary tube or a similar member for transmission of pressure, the longitudinal depression is of such depth that its bottom is at a greater distance from the heat and cold-transmitting surface than the generatrix of the capillary tube which lies nearest said surface.

The result obtained is that the capillary tube cannot prevent that at least two generatrices of the phial and two generatrices of the surface are in contact with each other.

In a fifth embodiment of the contact phial according to the invention, more particularly for use in connection with a multi-edged heat or cold-transmitting surface, the side walls of the deformation have flat surfaces forming a predetermined angle in relation to each other corresponding to the angle between two adjoining side surfaces on the said surface.

As a result, the flat surfaces of the said side walls may rest in contact with corresponding flat surfaces of the heat or cold-transmitting surface so that heat or cold is given off by the said surface to the contact phial at a further improved efficiency and the time interval before the pressure-operated device responds is further reduced.

The invention will now be further described with reference to the drawing, in which FIGURES 1 and 2 show a contact phial of known type mounted on a cylindrical surface for transmitting heat or cold, viewed from the side and in a sectioin on the line II—II of FIGURE 1, respectively.

FIGURES 3 and 4 represent an embodiment of a contact phial according to the invention, likewise viewed from the side and in a section on the line IV—IV of FIGURE 3.

FIGURE 5 shows another embodiment of the contact phial according to the invention, viewed in section.

FIGURE 6 shows a further embodiment of the invention as seen in transverse cross-section.

FIGURE 1 shows a contact phial of the aforesaid kind and of known type, consisting of a container 1 having substantially circular cross-section. The said container holds a liquid, vapour, gas or a gas-absorbing solid sensitive to temperature variations, and when in use the said container is in contact with a flat or cylindrical surface that transmits heat or cold, for example the surface of a pipe in a refrigerating plant. Temperature variations in the said surface act through the gaseous or liquid pressure in the container 1 upon a device not shown, for example a valve which regulates the cold given off by the referigerating plant. At one end of the container 1 is attached a filler pipe 3, which is sealed by soldering or welding or, for example, by compression when, for example, a liquid sensitive to temperature variations has been filled into the container. The other end of the container 1 is connected with a capillary tube 4 or a similar member for transmitting the pressure and which provides communication between the interior of the container and a device (not shown) operated by gaseous or liquid pressure. As will be seen more particularly from FIGURE 2 there is only contact between the cylindrical outer wall of the container 1 and the cylindrical surface of the pipe 2 along a single common generatrix 5 of the two surfaces.

FIGURE 3 shows an embodiment of a contact phial according to the invention, in which the container 1 has such a deformation 6 depressed in the cylindrical wall and extending parallel with the container axis that the container is able to rest in contact with the heat or cold-transmitting surface 2 along at least two generatrices 7 and 8 on the surface 2.

Tests with a contact phial of the known type, as shown in FIGURES 1 and 2, and with a contact phial according to the invention and as discolsed in FIGURES 3 and 4 have, under comparable conditions, disclosed that the heat or cold-transmitting contact is far more effective in a contact phial according to the invention than in a phial of the known design.

The following is a summary of results obtained by a series of tests:

When the surface 2 suddenly changed its temperature, the device acted upon by the contact phial according to the invention responded 40% faster than when acted upon by a phial of the known type.

In a preferred embodiment of the contact phial according to the inventtion the deformation consists of a longitudinal groove 9 depressed in the outer wall of the container, and in a suitable embodiment according to the invention the said longitudinal depression 9 is of such depth that its bottom is at a greater distance from the heat and cold-transmitting surface 2 than the generatrix of the capillary tube 4 lying nearest the said surface, which ensures that the capillary tube will not constitute any obstacle to the attachment of the contact phial on the surface 2.

In another embodiment of the contact phial according to the invention, shown in FIGURE 5, it is seen that the contact phial can be applied to the edge of a multi-edged tube 12 of rectangular cross-section with the contact surfaces of the phial resting upon the flat surfaces of the tube. In the embodiment of FIG. 6, the side walls of the depression 9 have flat surfaces forming a predetermined angle to each other, for example corresponding to an edge angle on the multi-edged heat or cold-transmitting surface 12'.

It will be appreciated that the embodiments of the contact phial disclosed in FIGURES 3, 4, 5 and 6 can be used in connection with cylindrical heat or cold-transmitting surfaces 2, which are almost of arbitrary diameters, that is to say, one and the same design of the contact phial or feeler may be used for pipings having widely different outer diameters, for example, varying from 7 mm. up to 50 mm., in fact even for contacting flat surfaces, and that the arrangement of the contact phial or feeler on such surfaces is highly facilitated thereby that the phial rests in contact with the surface along at least two straight lines or two rows of points located in straight lines. The phial or feeler will therefore not be liable to roll on the surface.

It will also be apparent to those skilled in the art that the phial substantially has maintained its circular cylindrical form, so that in the same way as a fully cylindrical phial it may be mounted in a normal phial pocket formed as a part of a tube having closed bottom.

What I claim and desire to secure by Letters Patent is:

1. A contact phial for thermostatically operated valves and similar pressure-controlled devices which are sensitive to the variation in fluid pressures, said phial comprising an elongated element defining an interior chamber containing a substance sensitive to temperature variations, said phial being adapted to be in contact with an associated elongated surface in parallel longitudinal relationship therewith and to transmit temperature variations of said surface to said devices, said elongated element being normally of circular transverse cross-section but being deformed radially inwardly along its entire length whereby to define a plurality of circumferentially spaced-apart longitudinally-extending contact surfaces for contact with said associated surface and to give said chamber a non-rectilinear transverse cross-sectional configuration.

2. A contact phial as defined in claim 1, wherein said element is deformed to provide an exterior longitudinal groove in the wall of the element, said groove being adapted to face said associated surface when the elongated element is placed in engagement therewith.

3. A contact phial as defined in claim 2, wherein at least one of the ends of said element is connected to a capillary tube for transmission of pressure and wherein said groove has a radial depth such that its radially-innermost surface is at most the same distance from said associated surface as it is from the nearest surface of said element in contact with said associated surface.

4. A contact phial as defined in claim 2, wherein said associated surface is a multi-edged surface and wherein said groove has substantially flat sides forming a predetermined angle to each other corresponding to the angle between two adjoining side portions of said associated surface.

5. A contact phial for thermostatically operated valves and similar pressure-controlled devices which are sensitive to the variation in fluid pressures, said phial comprising an elongated element defining an interior chamber containing a substance sensitive to temperature variations, said phial being adapted to be in contact with an associated elongated surface in parallel longitudinal relationship therewith and to transmit temperature variations of said surface to said devices, said elongated element being normally of circular cross-section but being deformed radially inwardly along its entire length whereby to give said chamber a substantially kidney-shaped transverse cross-section and to define a plurality of circumferentially spaced-apart longitudinally extending contact surfaces for contact with said associated surface.

6. In combination with an elongated surface, a contact phial for thermostatically operated valves and similar pressure-controlled devices which are sensitive to the variation in fluid pressures, said phial comprising an elongated element defining an interior chamber containing a substance sensitive to temperature variations, said phial being in direct contact with said surface in parallel longitudinal relationship therewith to transmit temperature variations of said surface to said devices, said elongated element being normally of circular transverse cross-section but being deformed radially inwardly along its entire length whereby to define a plurality of circumferentially spaced-apart longitudinally extending contact surfaces for contact with said first-named surface and to give said chamber a non-rectilinear transverse cross-sectional configuration, the portion of said phial between said contact surfaces being spaced from and completely out of contact with said first-named surface.

7. In combination with an elongated surface, a contact phial for thermostatically operated valves and similar pressure-controlled devices which are sensitive to the variation in fluid pressures, said phial comprising an elongated element defining an interior chamber containing a substance sensitive to temperature variations, said phial being in direct contact with said surface in parallel longitudinal relationship therewith and to transmit temperature variations of said surface to said devices, said elongated element being normally of circular transverse cross-section but being deformed radially inwardly along its entire length whereby to give said chamber a substantially kidney-shaped transverse cross-section and to define a plurality of circumferentially spaced-apart longitudinally extending contact surfaces providing said direct contact with said first-named surface, the portion of said phial between said contact surfaces being spaced from and completely out of contact with said first-named surface.

References Cited in the file of this patent

UNITED STATES PATENTS

| | | |
|---|---|---|
| 997,185 | Fournier | July 4, 1911 |
| 1,712,653 | Egloff | May 14, 1929 |
| 2,156,826 | Ullman | May 2, 1939 |
| 2,158,146 | Parks et al. | May 16, 1939 |
| 2,210,188 | Smith | Aug. 6, 1940 |
| 2,374,055 | Treanor | Apr. 17, 1945 |